Figure 1:
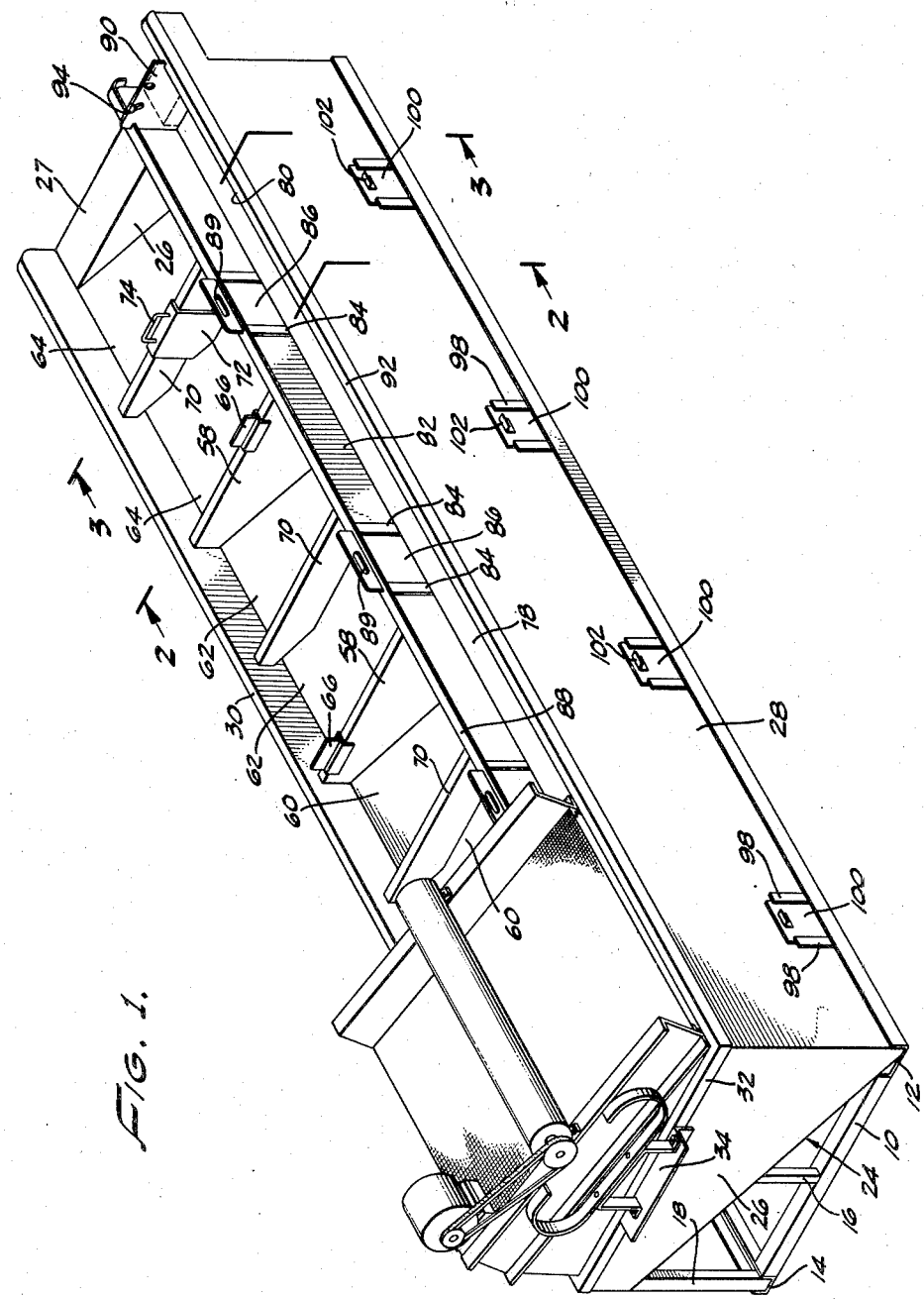

Dec. 24, 1957  R. CASNER ET AL  2,817,440
MUD FLUID CLASSIFIER

Filed March 28, 1955  2 Sheets-Sheet 1

INVENTORS
RALPH CASNER
BY ARNOLD S. MELTON

Theodore H. Lassagne
ATTORNEY

Dec. 24, 1957 R. CASNER ET AL 2,817,440
MUD FLUID CLASSIFIER
Filed March 28, 1955 2 Sheets-Sheet 2

INVENTORS
RALPH CASNER
ARNOLD S. MELTON
BY
Theodore H. Lassegne
ATTORNEY

United States Patent Office 2,817,440
Patented Dec. 24, 1957

2,817,440

MUD FLUID CLASSIFIER

Ralph Casner and Arnold S. Melton, Bakersfield, Calif.

Application March 28, 1955, Serial No. 496,992

3 Claims. (Cl. 209—208)

The present invention relates generally to apparatus for classifying selected solids from fluid suspensions, and more particularly to apparatus adapted to effect the removal of a finely divided solid such as sand from a fluid suspension of other solids such as a mud of the type conventionally used in the drilling of oil wells.

In the embodiment of the invention illustrated and described herein, a form especially adapted for use in separating sand from such drilling mud is specifically referred to, but it will be evident to those familiar with classifying apparatus that the invention may be employed with substantial advantage in other and different classifying applications.

In the drilling of oil wells, a hollow shaft is driven into the ground to reach the oil. The hollow shaft is disposed within a casing and is separated from the casing. While the hole is being drilled, a mud-laden fluid is passed through the shaft to a bit at the bottom of the shaft. The mud-laden fluid is then recirculated upwardly to the surface of the earth through the space between the shaft and the casing. The mud-laden fluid performs several functions. It carries in suspension any shale cuttings which have been formed by the drilling movement of the bit. It also provides a barrier against the escape of gas from the hole so as to prevent any blow-out of the oil well. The mud also serves to lubricate the bit during the drilling operation.

The mud which is used is relatively expensive. For example, the mud may be formed in part from certain barium compounds. Since the mud is relatively expensive, it is desirable to process it so that it can be used a number of times on a recirculating basis. Processing of the mud has been obtained by leading the mud over a screen and shaking the screen so that the mud will pass through the screen while cuttings are retained by the screen. This process has been satisfactory in separating the shale cuttings but it has not separated such foreign matter as sand from the mud. The sand often becomes mixed with the mud when a drilling operation is being performed in sandy areas. The inclusion of sand with the mud recirculated into the well is undesirable because the sand is abrasive and damages the cutting edge of the bit.

This invention provides apparatus for us at oil wells in sandy locations for separating sand from the mud-laden fluid so that the mud can be used again in the drilling operation. The apparatus includes a plurality of settling chambers defined by an inclined bottom wall and by a plurality of spaced weirs. Baffles are disposed between the weirs and are separated from the inclined bottom wall so that the fluid flows over the weirs and under the baffles in an undulating pattern. This undulating movement of the fluid facilitates the settling of the sand particles on the bottom of the chambers.

An important feature of the invention is the provision of means whereby solids classified out of the fluid stream may be withdrawn from the apparatus without interruption of the fluid stream and without loss of fluid. For this purpose the apparatus includes a bypass trough extending in the direction of fluid movement, in combination with gates providing selective communication between the trough and each chamber; this arrangement being such that any particular chamber can be bypassed by the flow of fluid when certain gates are open. In this way, the bypassed chamber can be cleaned without interrupting the flow of fluid. Ports are also provided at the bottom of the inclined walls in communication with each chamber to facilitate the removal of sand from the chamber.

Figure 2:
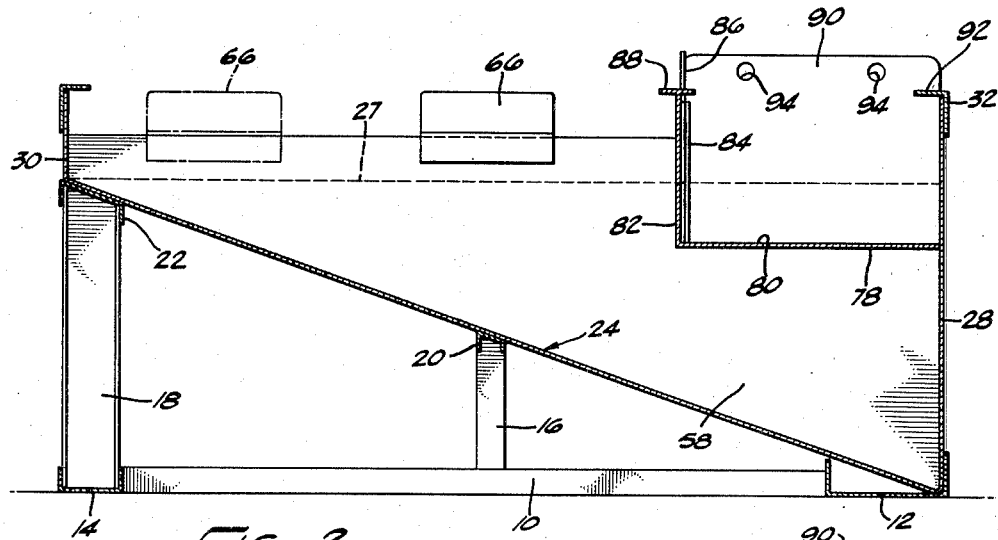
Figure 3:
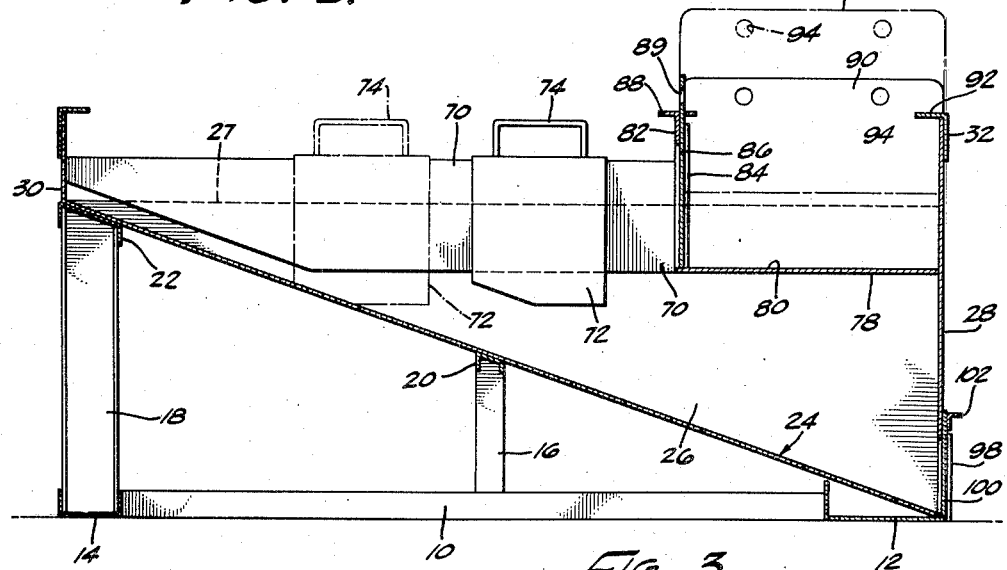
Figure 4:
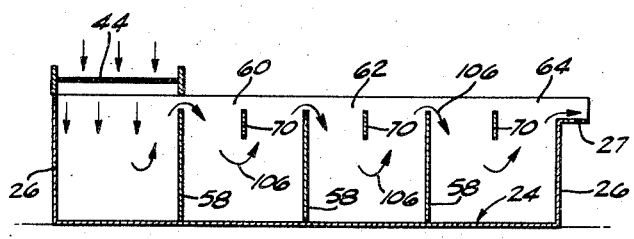

In the drawings:

Figure 1 is a perspective view of the separating apparatus as seen from a position above, in front of and to the left of the apparatus;

Figures 2 and 3 are enlarged sectional views substantially on the lines 2—2 and 3—3, respectively, of Figure 1 and illustrate in further detail certain features shown in Figure 1, certain of the members being shown in broken lines in alternate position; and Figure 4 is a somewhat schematical sectional view of certain members shown in the previous figures and illustrates the operation of these members.

In the embodiment shown in the drawings, a plurality of support bars 10 are laterally disposed at spaced intervals in a longitudinal direction. The support bars 10 are suitably connected as by welding to a first C-shaped channel member 12 extending longitudinally along the front of the separating apparatus and to a second C-shaped channel member 14 extending longitudinally along the rear of the apparatus. First stanchions 16 extend upwardly from the support bars 10 at an intermediate position in the lateral direction. Second stanchions 18 extend upwardly from the C-shaped channel at a rearward position in the lateral direction. The stanchions 18 extend upwardly for a greater distance than the stanchions 16 for reasons which will become apparent subsequently.

Brackets 20 and 22 are respectively supported by the stanchions 16 and 18 in a longitudinal direction at the tops of the stanchions. A platform 24 made from a sheet of suitable material, such as steel, is in turn supported on the brackets 20 and 22 and is inclined downwardly at a relatively shallow angle as it extends from the rear toward the front of the separating apparatus. At its front end, the platform 24 is disposed against the bottom and front vertical walls of the C-shaped channel member 12.

The platform 24 is suitably connected to a pair of side plates 26 (Figure 1) which extend upwardly from the plate 24 at opposite ends of the plate in the longitudinal direction. A table portion 27 extends longitudinally to the right from the top of the right side plate 26 for purposes which will be disclosed in detail subsequently. A front plate 28 (Figures 1, 2 and 3) and a rear plate 30 extend upwardly from the platform 24 between the boundaries defined by the side plates 26. The plates 26, 28 and 30 may also be made from sheets of suitable material such as steel. In this way, the inclined platform 24, the side plates 26 and the front and rear plates 28 and 30 form an enclosure.

A support member 32 (Figure 1) having an inverted L-shape is connected to the side plate 26 at the top of the plate. The support member 32 carries a bracket 34 and provides, in conjunction with a similar oppositely located support member and bracket (not shown) a mounting for a conventional shaker of the type commonly used to separate coarse material such as shale cuttings from fluid media such as drilling mud. Such shakers are well known in the art and need not be described in detail.

The enclosure formed by the inclined platform 24, the side plates 26 and the front and rear plates 28 and 30 is divided into a number of separating chambers by a plurality of weirs 58. The weirs 58 are preferably spaced from one another at regular intervals in the longitudinal direction so as to form settling chambers of substantially equal volume. In the drawings, three settling chambers designated as 60, 62 and 64 are shown.

The weirs 58 have bottom edges which are inclined at the same angle as the platform 24 so as to contact the platform along their full lateral dimension. The weirs 58 extend upwardly for a distance to a position somewhat below the tops of the front and rear plates 28 and 30. Each of the weirs 58 supports a channel eliminator 66 (Figures 1 and 2). The channel eliminators 66 extend upwardly from the weirs and form tongue-and-groove relationships with the weirs for slidable movement laterally along the weirs. The function of the channel eliminators 66 will be described in detail subsequently.

Baffles 70 are disposed in each of the settling chambers 60, 62 and 64. As will be best seen in Figures 3 and 4, the baffles 70 are separated from the platform 24 along substantially the entire lateral dimension so as to provide for a passage of mud-laden fluid through the space between the bottom of the baffles. The baffles 70 carry channel eliminators 72 (Figures 1 and 3) which extend downwardly to a position below the bottom of the associated baffles. The channel eliminators 72 form tongue-and-groove relationships with the baffles 70 for slidable movement laterally along the baffles. This slidable movement is facilitated by providing handles 74 at the top of the channel eliminators 72 for manual gripping.

A wall 78 extends in a longitudinal direction at a position near the front of the separating apparatus. The wall 78 is at substantially the same vertical level as the bottom of the baffles 70. The wall 78 forms a trough 80 with the front plate 28 and with an intermediate plate 82 extending in a longitudinal direction parallel to the front plate 28. The plate 82 is provided with pairs of braces 84 which extend upwardly to the top of the wall. Each pair of braces 84 is positioned slightly to the right of a different weir 58 in the longitudinal direction so as to be associated with a particular one of the chambers 60, 62 and 64. The braces 84 are hollow so as to be separated by a relatively short distance from the plate 82. Gates 86 extend through a horizontal support portion 88 at the top of the wall 82 and through the space between the plate 82 and the braces 84. The gates 86 are disposed in vertically slidable relationship to the braces 84 and are adapted to be moved upwardly by the manual gripping of the gates at openings 89 in the top of the gates. When opened, the gates 86 communicate with their associated settling chambers 60, 62 and 64.

A gate 90 extends laterally across the trough 80 at the right end of the trough so as to provide a closure of the trough. The gate 90 extends upwardly from the trough through slots in the horizontal support portion 88 of the plate 82 and through a horizontal support portion 92 at the top of the wall 28. The gate 90 is provided with holes 94 for purposes of manual gripping. The gate 90 is disposed in contiguous relationship to the table portion 27. When raised a sufficient distance, the gate 90 is adapted to rise above the table portion 27 so as to open the trough 80 at its right end.

Pairs of braces 98 (Figures 1 and 3) are supported by the front plate 28 at the bottom of the plate. The braces 98 are separated somewhat from the plate 28 so that gates 100 can slide in a vertical direction. The gates 100 are provided with tabs 102 which can be manually gripped to facilitate the vertical movement of the gates. When the gates 100 are moved upwardly, ports are produced for communication with the different settling chambers.

As a first step in the processing of drilling mud by the present apparatus, the mud is conveyed from the well and dropped on the shaker (Figure 1). The mud-laden fluid retrieved in the drilling operation becomes sifted as the shaker vibrates. The small particles such as the particles of mud and sand pass through the shaker as its screen vibrates. The small particles passing through the screen may also include foreign matter such as sand when the drilling is taking place in a sandy area. The large particles such as the shale cuttings are not able to pass through the screen as the shaker vibrates. This causes the large particles to move downwardly along the top of the screen under the force of gravity during the vibration of the screen and to drop on the ground in front of the screen.

The fluid suspended particles and mud and sand passing through the screen drop into the chamber below the screen. The suspension then flows over the weir 58 defining the left end of the settling chamber 60 and under the baffle 70 in the chamber. The suspension continues the movement over successive chambers and under successive baffles as shown by arrows 106 in Figure 4. In this way, the particles move in an undulating or sinuous path so as to travel through a relatively long distance in a compact space. As the particles move in this undulating pattern, the particles of sand settle to the bottom of the settling chambers 60, 62 and 64 (Figures 1 and 4) so that the material continuing the movement through the chambers becomes gradually purified to a substantially pure form of mud. The mud then flows over the plate 26 and the table portion 27 defining the right end of the settling apparatus and accumulates in a pit (not shown) for subsequent use. By including the table portion 27, the fluid is able to flow into the pit in a regulated and even pattern.

As the fluid flows in an undulating pattern over the weirs 58 and under the baffles 70, its flow tends to become channelized. This channelling action is produced in a manner similar to that in which streams are produced by the continued flow of fluid. The channelling action is undesirable since it prevents the full volume of the settling chambers 60, 62 and 64 from being effectively utilized. In order to minimize such channelling actions, the channel eliminators 66 (Figures 1, 2 and 3) are included on the weirs 58 and the channel eliminators 72 are included on the baffles 70. The channel eliminators 66 and 72 are respectively moved manually along the weirs 58 and the baffles 70 into position to block the channels which are formed. In this way, the fluid has to adopt other paths through the chambers 60, 62 and 64, so as to flow over the weirs 58 and under the baffles 70 along the full lateral dimension of these members.

Under the continued flow of fluid through the chambers 60, 62 and 64, a substantial amount of sand may accumulate at the bottom of the chambers. This sand tends to slide downwardly toward the bottom of the chambers because of the inclined disposition of the platform 24. The foreign matter such as sand can be easily removed from the chambers by lifting the gates 100 (Figures 1 and 3) associated with the chambers. The gates can be easily lifted by manually operating the tabs 102 so as to slide the gates upwardly in the braces 98. When the gates 100 are lifted, ports communicating with the chambers 60, 62 and 64 are formed for the easy and convenient removal of the foreign matter such as sand. The removal of the foreign matter can be accomplished by the use of a suitable implement such as a shovel.

During the time that foreign matter such as sand is being removed from a particular one of the chambers, it is desirable that the mud-laden fluid continue to flow through the other chambers. This continued flow is desirable so as not to interrupt the drilling operation or to impair the drilling operation by the use of contaminated fluid. The continued flow and purification of the fluid is obtained by opening particular ones of the gates 86. For example, if it should be desired to clean the settling chamber 60, the gates 86 (Figure 1) associated with the chambers 60 and 62 are opened. This causes the fluid to flow into the trough 80 through the gate associated with the chamber 60. The fluid then continues along the trough until it reaches the gate 86 associated with the chamber 62. The fluid flows through this gate into the chamber 62 and continues its movement through the chambers 62 and 64. In this way, the purifying action on the fluid is provided in the chambers 62 and 64. The fluid is not able to continue along the trough past the gate 86 associated with the chamber 62 since the gate 90 is closed.

In like manner, the chamber 62 can be bypassed by closing the gate 86 associated with the chamber 60 and by opening the gates associated with the chambers 62 and 64. Similarly, the chamber 64 can be bypassed by closing the gates 86 associated with the chambers 60 and 62 and by opening the gate 90 and the gate 86 associated with the chamber 64. Since the table portion 27 is disposed in contiguous relationship to the gate 90, fluid can flow past the gate 90 only when the gate is positively opened by a manual lifting of the gate.

The apparatus described above has certain important advantages. It produces an effective separation of fine particles of foreign matter such as sand from a mud-laden fluid so that the fluid can be efficiently used on a recirculating basis in a drilling operation. The apparatus produces this effective separation of particles in a relatively compact space by subjecting the fluid to an undulating flow and by preventing a channelized flow of the fluid through the compact space. The apparatus also includes certain features such as a trough and gates for bypassing the flow of fluid around different settling chambers formed in the compact space. An inclined bottom platform and clean-out ports are included in the apparatus to facilitate the removal of the foreign matter from each settling chamber when the chamber is being bypassed.

What is claimed is:

1. In apparatus for the separation of sand and rock from a continuously circulated mud laden fluid, the combination with means defining a path of flow for said fluid, a series of weirs disposed in spaced relationship along said path to cause said fluid to flow thereover, a series of baffles disposed along said path in interspersed relation with said weirs whereby said fluid is deflected beneath said baffles, and a channel eliminator slidably mounted for movement along the upper edge of each of said weirs and transverse to the path of fluid flow for deflecting said fluid transversely within said path.

2. In apparatus for the separation of sand and rock from a continuously circulated mud laden fluid, the combination with means defining a path of flow for said fluid, a series of weirs disposed in spaced relationship along said path to cause said fluid to flow thereover, a series of baffles disposed along said path in interspersed relation with said weirs whereby said fluid is deflected beneath said baffles, and a channel eliminator slidably mounted for movement along the lower edge of each of said baffles and transverse to the path of fluid flow for deflecting said fluid transversely within said path.

3. In apparatus for the separation of sand and rock from a continuously circulated mud laden fluid, the combination with means defining a path of flow for said fluid, a series of weirs disposed in spaced relationship along said path to cause said fluid to flow thereover, a series of baffles disposed along said path in interspersed relation with said weirs whereby said fluid is deflected beneath said baffles, a first channel eliminator slidably mounted for movement along the upper edge of each of said weirs and transverse to the path of fluid flow, and a second channel eliminator slidably mounted for movement along the lower edge of each of said baffles and transverse to the path of fluid flow; said channel eliminators serving to deflect said fluid transversely within said path.

References Cited in the file of this patent

UNITED STATES PATENTS

| Number | Name | Date |
|---|---|---|
| 95,089 | Cowley | Sept. 21, 1869 |
| 291,190 | Isbell | Jan. 1, 1884 |
| 397,585 | Coplen | Feb. 12, 1889 |
| 496,670 | Simmons | May 2, 1893 |
| 745,870 | Lowe | Dec. 1, 1903 |
| 1,333,287 | White | Mar. 9, 1920 |
| 1,829,544 | Schilling | Oct. 27, 1931 |